Feb. 22, 1927.  T. L. FEENEY ET AL  1,618,417
FIRE PREVENTING APPARATUS FOR MOTION PICTURE PROJECTING MACHINES
Filed Aug. 21, 1926   5 Sheets-Sheet 1

WITNESSES
Evelyn Crompton
George A. Gruss

INVENTORS
Thomas Louis Feeney
Humbert Godoy
BY
Joshua R.H. Potts
ATTORNEY

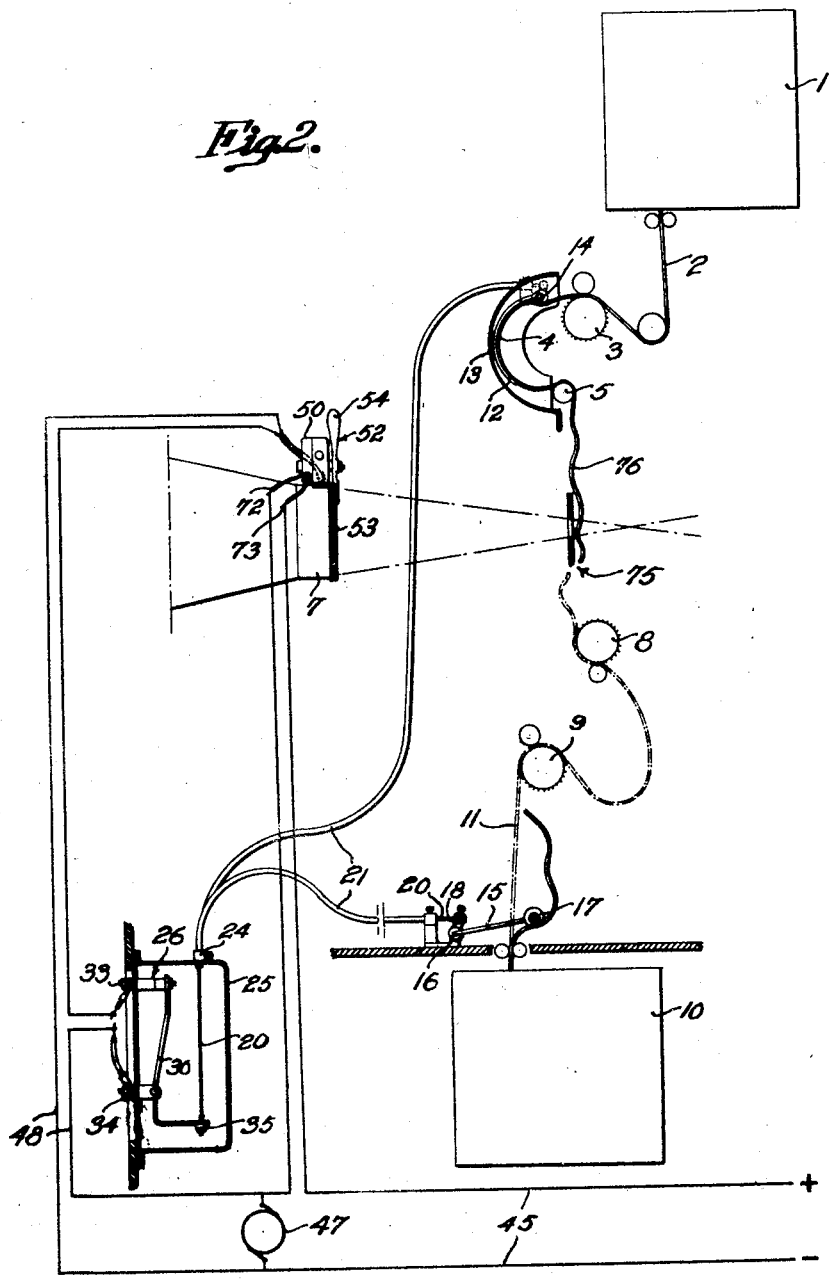

Feb. 22, 1927.  T. L. FEENEY ET AL  1,618,417
FIRE PREVENTING APPARATUS FOR MOTION PICTURE PROJECTING MACHINES
Filed Aug. 21, 1926    5 Sheets-Sheet 3
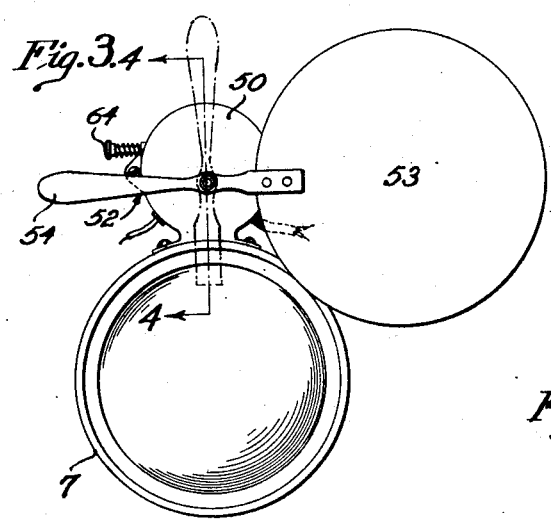
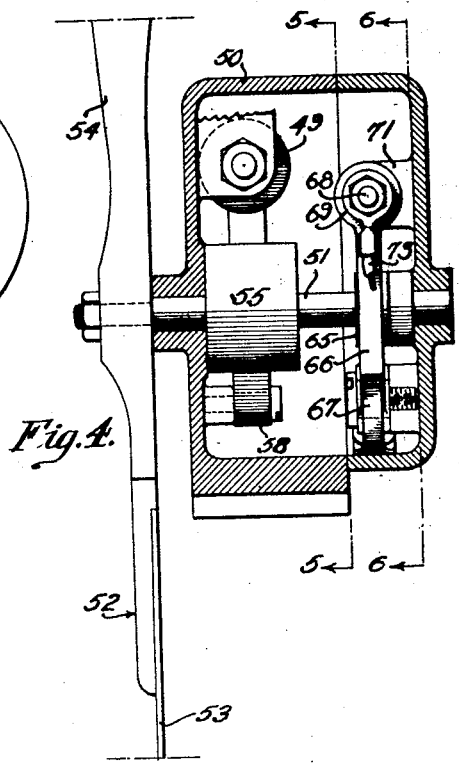
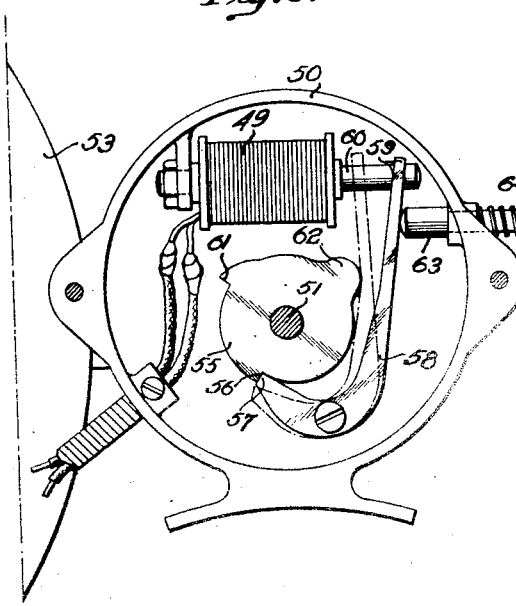
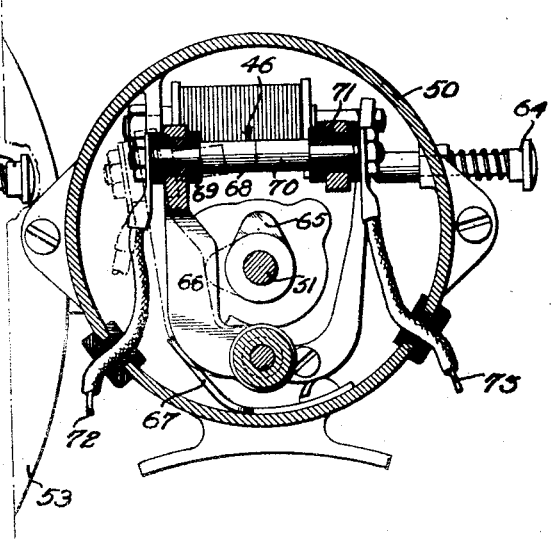
WITNESSES
Evelyn Crompton
George A. Gruss
INVENTORS
Thomas Louis Feeney
Humpert Godoy
BY Joshua R. H. Potts
ATTORNEY Feb. 22, 1927. 1,618,417
T. L. FEENEY ET AL
FIRE PREVENTING APPARATUS FOR MOTION PICTURE PROJECTING MACHINES
Filed Aug. 21, 1926 5 Sheets-Sheet 4

WITNESSES
Evelyn Crompton
George A. Gruss

INVENTORS
Thomas Louis Feeney
Humbert Godoy
BY
Joshua R. H. Toth
ATTORNEY

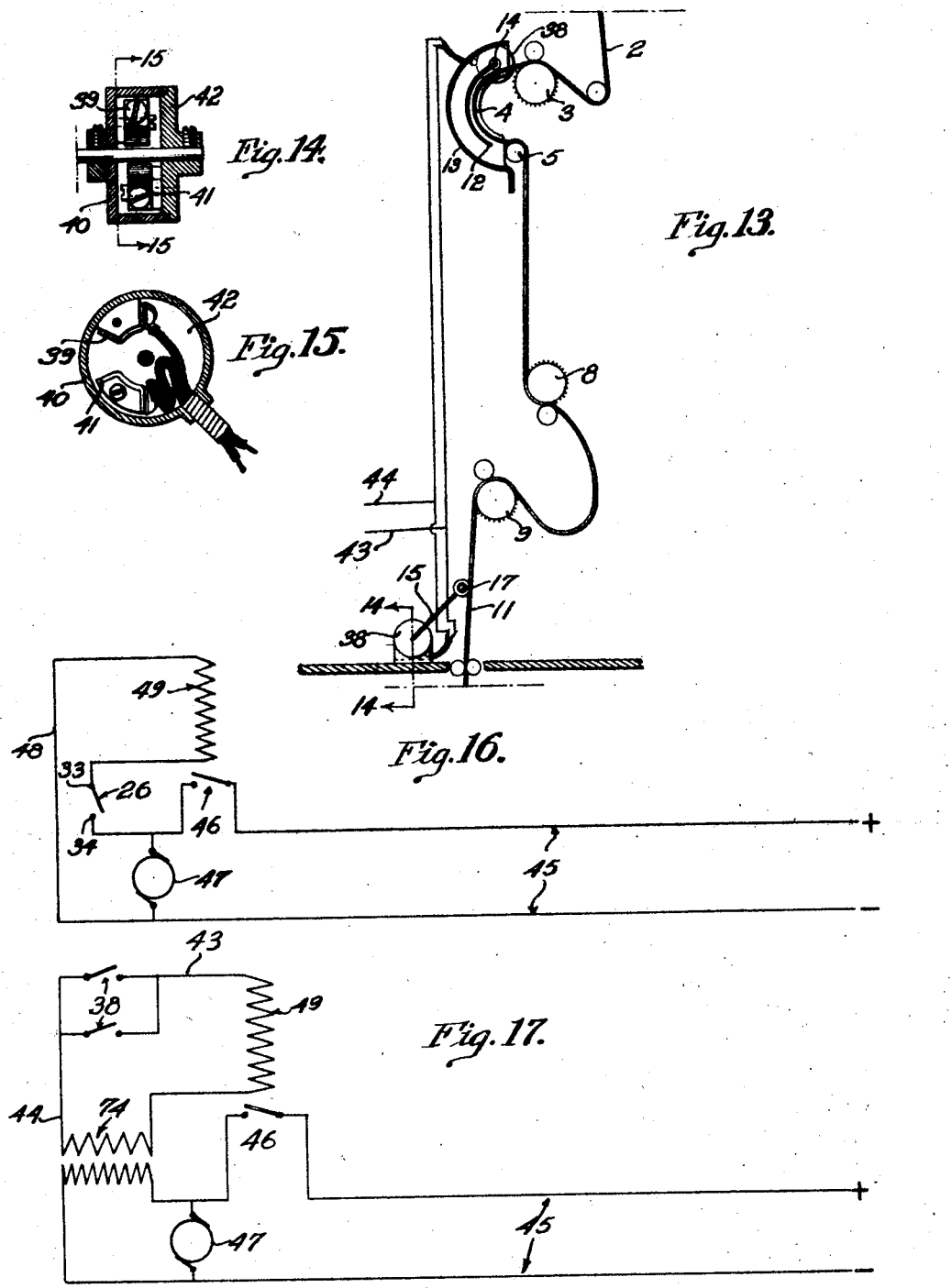

Patented Feb. 22, 1927.

1,618,417

UNITED STATES PATENT OFFICE.

THOMAS LEWIS FEENEY AND HUMBERT GODOY, OF PHILADELPHIA, PENNSYLVANIA, ASSIGNORS OF NINETY PER CENT TO JOSEPH E. COHEN, OF PHILADELPHIA, PENNSYLVANIA, AND TEN PER CENT TO SAID FEENEY.

FIRE-PREVENTING APPARATUS FOR MOTION-PICTURE-PROJECTING MACHINES.

Application filed August 21, 1926. Serial No. 130,608.

Our invention relates to fire preventing apparatus for motion picture projecting machines.

The hazard of setting fire to the film when it breaks in its passage in the projector, is well known and much experimenting has been done to devise a way of eliminating this condition. As a result of this activity many devices were introduced to put an end to this danger, but none, as far as we are aware, were found satisfactory.

The objects of our invention are to provide a simple arrangement of devices on a motion picture projecting machine, which will co-act with the film when broken to effect obstruction of the powerful beam of light and thus prevent its intense heat waves from playing on and setting fire to the idle film; to electrically connect these devices in such manner as to effect stopping of the motor when the film breaks; to provide devices of such nature that the usual dowser is used for obstructing the beam of light and when moved from the light obstructing position, such as when starting the machine to project a film, the motor will be automatically started; and to provide devices which may be operated manually as well as electrically to bring the dowser into light obstructing position and stop the motor.

These objects, and other advantageous ends which will be described hereinafter, we attain in the following manner, reference being had to the accompanying drawings in which—

Figure 1:
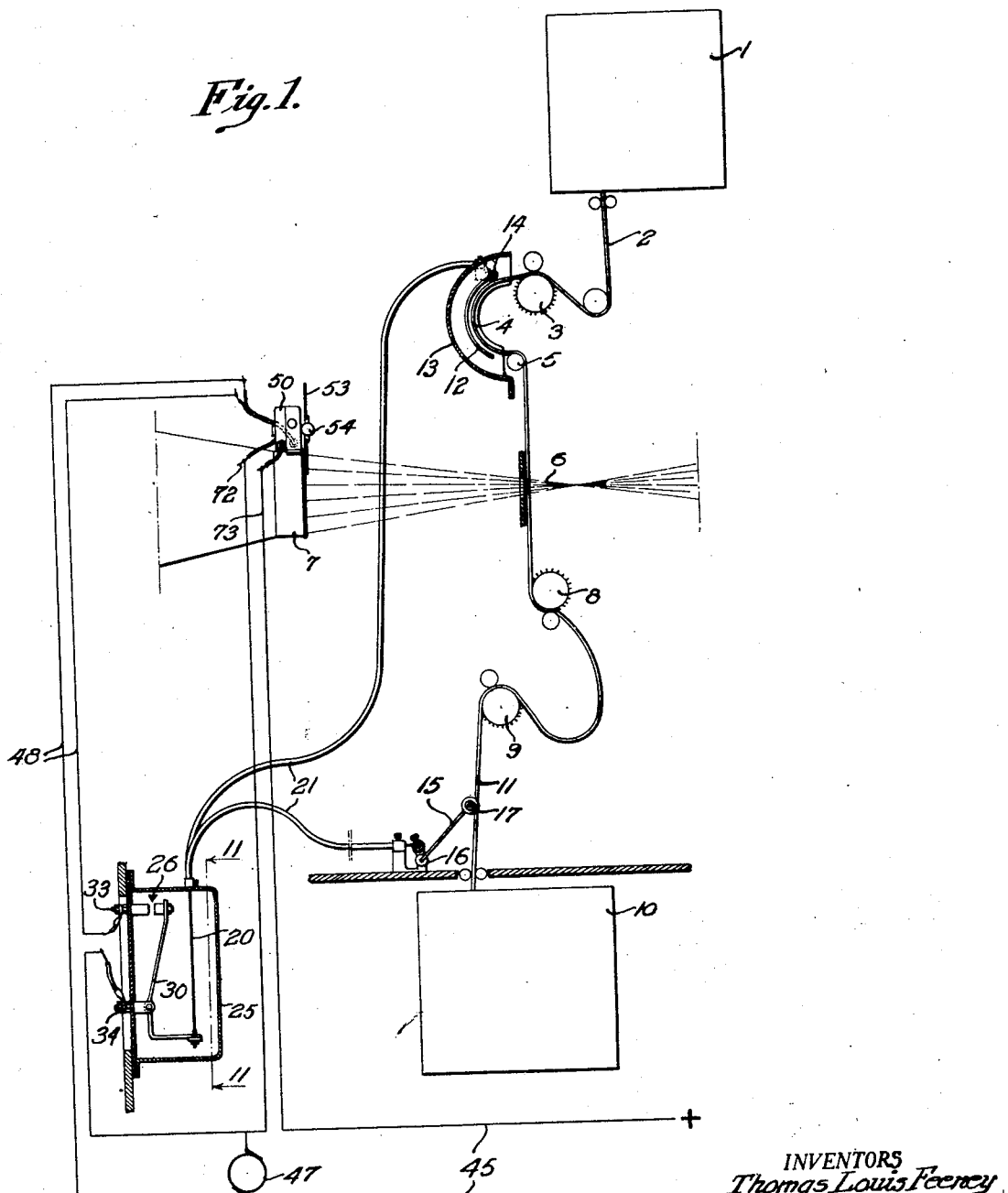
Figure 7:
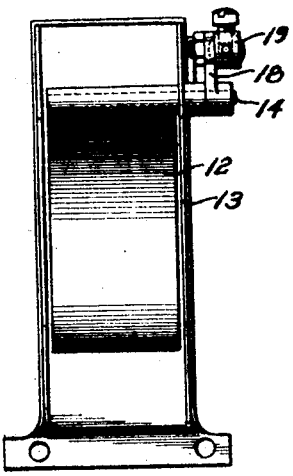
Figure 8:
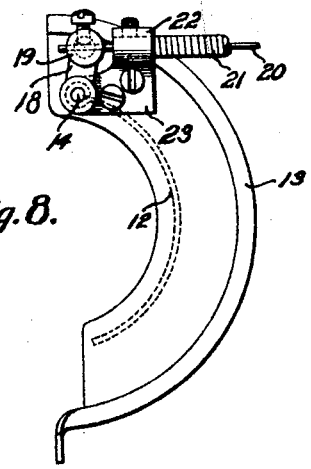
Figures 9, 10, 11, 12:
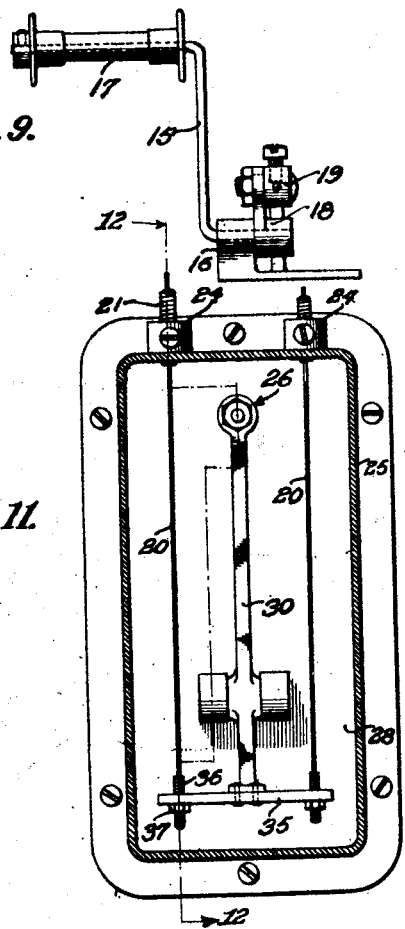

Figure 1 is a schematic view of a motion picture projecting machine showing the elements which co-act with our apparatus, illustrating an unbroken film with the beam of light passing therethrough, Figure 2 a like view illustrating the film broken and the parts moved to another position to effect stopping of the motor and cutting off the light, Figure 3 a fragmentary face view of the lamp funnel showing the dowser operating device attached thereto, Figure 4 an enlarged section taken on line 4—4 of Figure 3 with the lens funnel omitted and the dowser in a vertical or light obstructing position, Figure 5 a section on line 5—5 of Figure 4 with the dowser shown in the horizontal position, Figure 6 a section on line 6—6 of Figure 4, the dowser being shown in a horizontal position, Figure 7 an inner face view of one of the film actuated arms which form a part of our invention, Figure 8 a side view of the arm looking from the right of Figure 7, Figure 9 a front view of another film actuated arm, Figure 10 a side view looking from the right of the arm shown in Figure 9, Figure 11 an enlarged section on line 11—11 of Figure 1, Figure 12 a section substantially on line 12—12 of Figure 11, Figure 13 a fragmentary schematic view similar to Figure 1 showing a modified arrangement of our apparatus, Figure 14 an enlarged section taken substantially on lines 14—14 of Figure 13, certain of the parts being omitted for clearness, Figure 15 a section on line 15—15 of Figure 14, Figure 16 an electrical diagram showing how the parts are connected, and Figure 17 a like view showing the electrical connections as made with the modified form of apparatus shown in Figure 13.

We have shown our apparatus as applied to one type of motion picture projecting machine but it may be applied equally well to other types without requiring material changes or departure from the principle upon which the apparatus functions.

Referring to the drawings, the type of projecting machine shown includes a magazine 1 from which a film 2 is fed by an upper feed sprocket 3. The film loops at 4 and passes over an idler 5, then through a beam of light 6 coming from a lamp 7, then to an intermittent sprocket 8 which pulls the film intermittently through the beam of light, and over a lower feed sprocket 9 to a lower magazine 10. Loop 4 co-acts with one of the film actuated arms and the part 11 of the film co-acts with the other film actuated arm, to effect movement of the arms when the film breaks. These arms will now be described.

The arm which co-acts with the loop 4 is in the form of a curved strip 12 disposed in and swingably mounted on a loop guard 13 by a shaft 14 fixed with the strip. When the film breaks, for example as shown in Figure 2, the upper end of the film will stop and loop 4 will become larger owing to the film being fed by the upper feed sprocket 3. As the loop becomes larger it will engage and move arm 12. This movement of the arm is transmitted to a switch which closes a circuit and effects a cutting off of the light passing through the film and a stopping of the motor which operates the sprockets.

The other arm 15 which co-acts with the part 11 of the film, has a shaft on one end mounted in a bearing 16 and a weighted roller 17 on the other end bearing against the film. When the film breaks and the part 11 of the film becomes slack, the weighted roll 17 will swing the arm to the position shown in Figure 2. This movement like the movement of arm 12, is transmitted to effect closing of a switch to effect cutting off the light 6 passing through the film and to effect stopping the motor which operates the projector.

The arms 12 and 15 may be connected in various ways to the switch, for example they may both be connected to a common switch mounted at a distance from the film as shown in Figure 1, or they may each be connected to a switch adjacent the film as shown in Figure 13. In either case the principle of operation of the apparatus is identical.

In Figure 1, the arms 12 and 14 are connected to a common switch in a similar manner and a description of the connection of one arm will suffice for both. The shaft of each arm has a fixed crank 18 (see Figures 7–10), and a crank pin 19, pivoted on the crank, has one end of a wire 20 adjustably connected thereto by a screw. The wire passes through a flexible tubing 21 secured in a bracket 22 integral with a base 23 integral with the bearing in which the arm shaft is mounted. The other end of the tubing is secured in a boss 24 of a casing 25 which encloses a switch 26. The wire 20 passes from tubing 21 into the casing and is connected for closing the switch 26 (see Figures 11 and 12). The switch has a stationary contact 27 mounted on an insulating casing back 28 and a movable contact 29 carried by a lever 30, of electric conducting material, fulcrumed at 31, in bearings 32 also of electric conducting material, secured to casing back 28. The stationary contact 27 has a terminal 33 and one of the bearings 32 has a terminal 34 for electrical connection to a circuit. Lever 30 is swung to bring contact 29 against contact 27 by either of the wires 20 connected to an insulating bar 35, on the end of the lever, by threaded studs 36, secured on the end of the wires and passing through the insulating bar, and nuts 37 on the studs and abutting the under side of the bar. When arms 12 and 15 are swung, owing to a broken film, their movement is transmitted by the wires 20 to lever 30 to close switch 26. The purpose of this type of connection between the arms and the switch, is to enable mounting the switch at a distance from the film.

In Figure 13, we have omitted this type of connection and instead connected a switch 38, shown in detail in Figures 14 and 15, directly with each arm 12 and 15 adjacent the film. Each switch 38 includes a stationary contact 39 mounted in a casing 40, and a movable contact 41 mounted on a disk 42 fixed with the shaft of the arm. When either arm is swung, disk 42 will bring movable contact 41 into engagement with stationary contact 39 to close the switch. These switches are connected in parallel to common wires 43 and 44 which are connected in a circuit in the same manner as the terminals 33 and 34 of switch 26. In Figures 16 and 17, electrical diagrams show how terminals 33 and 34 of switch 26 and wires 43 and 44 of switches 38 are connected.

In Figure 16, a motor circuit 45 includes a motor switch 46 and a motor 47. A solenoid circuit 48 is connected in parallel with motor 47 and includes a solenoid 49 and switch 26 which will hereinafter be called a "solenoid switch". When switch 26 is closed, a solenoid 49 will be energized which will effect an opening of motor switch 46 to stop the motor, and will cause a dowser to be swung in position to cut off the light passing through the film.

The dowser actuating device includes a casing 50, a shaft 51 rockable in the casing and having a dowser 52 fixed to its end outside of the casing. The dowser has a light obstructing plate 53 on one end and a handle 54 on the other end by which the plate may be brought into and out of light obstructing position. When the dowser is in the horizontal position it is out of light obstructing position and is held in this horizontal position by tripping means which includes a collar 55 fixed to shaft 51, and having a notch 56 engaged by one end 57 of a latch 58. The other end 59 of the latch is connected with a plunger 60 of solenoid 49 which may be of any suitable construction. When the solenoid is energized it will draw in its plunger 60 and swing latch 58 out of notch 56 and release the dowser to swing by its weight downward to vertical or light obstructing position. The downward movement of the dowser is limited by a stop 61 on collar 56, which comes into engagement with the end 57 on the latch. Upon swinging the dowser by handle 54 to the horizontal position, a cam 62 on collar 55, will engage and move the latch from the dot-and-dash line position, shown in Figure 5, into engagement with notch 56. To manually release the dowser to swing downwardly, a spring-pressed plunger 63 is slidably mounted in the casing and has its inner end engaging latch 58 and its outer end extending out of the casing and provided with a push button 64. Upon pressing the push button the plunger will swing latch from engagement with notch 56.

Motor switch 46 is opened as the dowser is swung downward to light obstructing position, and closed as the dowser is swung upward from the light obstructing position. This is effected by a cam 65 fixed with shaft 51, coming into engagement with and swinging an arm 66 against the action of a spring 67. One contact 68 of motor switch 46 is mounted on and insulated from the end of arm 66 by suitable insulating bushings 69, and the other contact 70 is likewise secured to and insulated from a lug 71 extending from casing 50. These contacts are connected by electric wires 72 and 73 which pass out of the casing through suitable insulating bushings.

In Figure 17, the motor circuit is identical with the motor circuit shown in Figure 6 and the solenoid circuit is similar to the solenoid circuit 48 except that the wire 43 connected with one side of switches 38, is connected with solenoid 49, and a transformer 74 is connected in parallel with the motor and connected with the wire 44 and solenoid 49. This transformer is preferably interposed in the solenoid circuit to step down the voltage to reduce the possibility of sparking adjacent the film at switches 38. In all other respects the function and electrical connections of the circuit shown by Figure 17 are similar to those of Figure 16 and similar reference characters have been applied to corresponding elements.

The operation of the machine is as follows:

The film is fed from the upper magazine 10 to the lower magazine by the sprockets 1 3, 8 and 9 through the beam of light 6 which passes from lamp 7 through the film to project its images on the screen. The sprockets are operated by a motor, diagrammatically illustrated at 47, in any well known manner. Should the film break, for example at the point 75 below the beam of light, the part 76 of the film adjacent the broken end will stop in the light, while the film in the upper magazine will be fed by the upper feed sprocket 3. This will enlarge loop 4 and cause it to engage and swing arm 12 which in turn will pull wire 20 and swing lever 30 to bring its contact 29 into engagement with contact 27 and thus close the solenoid switch 26. Solenoid 49 will become energized and will draw in its plunger 60 to swing latch 58 from engagement with notch 56. The dowser will then swing downward by its weight to cut off the light as shown in Figure 2, thus preventing burning of the film. As the dowser swings into the light obstructing position, cam 65 engages and swings arm 66 to the dot-and-dash line position shown in Figure 6 to swing contact 68 from contact 70 and thus open the motor switch diagrammatically illustrated at 46 in Figures 16 and 17. This will open the circuit and stop motor 47 before damage is done to the film by the moving parts of the projector.

It is thus seen that upon the breaking of the film above the intermittent sprocket 8, loop 4 will become enlarged and will engage and swing arm 12. This movement of the arm closes the solenoid switch 26 and effects a release of the dowser to cut off the beam of light before it ignites the film, and also effects a stopping of the motor before the film is damaged.

Should the film break below intermittent sprocket 8, loop 4 would not become enlarged but the broken end of the film passing to the lower magazine will, when it leaves the lower feed sprocket 9, produce slack in the part 11 of the film which will allow the weighted arm 15 to swing downward to the position shown in Figure 2. This will pull wire 20 and swing lever 30 to close switch 26. Upon the closing of the switch, dowser 52 will be released to swing by its weight to the light obstructing position in the same manner as before and the motor switch 46 will be opened to stop the motor.

When the switches 38 are used instead of the switch 26, as shown in Figure 13, the operation of the dowser for cutting off the light and effecting a stopping of the motor is identical with the operation just described. The only difference between the function of the arrangement shown in Figure 13 and the one shown in Figure 1 is that a swinging movement of either of the arms 12 and 15 will cause its respective switch 38 to close. Upon the closing of either of these switches, the solenoid circuit in Figure 17 will be closed and solenoid 49 will become energized. The switches 38 are closed by the turning of the arm shaft to rotate disk 42 and bring its contact 41 against the contact 39 on the casing 40 of the switch. The co-action of the arms 12 and 15 to obtain movement when the film breaks is similar to that described relatively to Figure 1.

After the film is repaired and the arms 12 and 15 are brought to their former position, as shown in Figures 1 and 13, dowser 52 is swung from the light obstructing position by the handle 54. As the dowser is swung upward to this position, cam 65 is moved from arm 66 to allow its spring 67 to swing it inward and bring its contact 68 against contact 70 and thus close the motor switch and effect a starting of the motor. The film will then be moved from the upper magazine to the lower magazine through the beam of light 6. When the dowser is out of light obstructing position, the cam 62 on collar 55, will engage and swing latch 58 from the dot-and-dash line position to engage notch 56 as shown in Figure 5, and thus hold the dowser in the horizontal position. Owing to the connection of the end 59 of the latch with the plunger 60 of solenoid 49, plunger 60 is thereby withdrawn from the solenoid and the solenoid is thus reset for operation again in the same manner as before.

If for any reason the apparatus gets out of order the dowser is released by pressing on push button 64 to slide the plunger 63 into the casing and swing latch 58 from engagement with the notch 56 in the same manner as swung by the solenoid 49, thus releasing the dowser to be swung by its weight to the light obstructing position.

It will be seen that the apparatus when installed on a motion picture projector in a manner above set forth, will eliminate the danger of the film becoming ignited when broken. The dowser will automatically stop the motor when released to swing to light obstructing position and will automatically start the motor when swung from the light obstructing position after the broken film is repaired. The release of the dowser is effected by the closing of a switch which may be connected to the film actuated arms to effect such closing, in different ways to meet different requirements on the various types of motion picture projectors.

While we have described our invention as taking a particular form, it will be understood that the various parts may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patents is:

1. In combination with a motion picture projector, its film, motor circuit and lamp; a support; a shaft rockable in the support; a dowser carried by the shaft and adapted to swing in front to obstruct the light of the lamp; tripping means connected with the shaft to hold the dowser out of the way; a solenoid for tripping said means to release the dowser; electrical means for energizing the solenoid; film actuated mechanism connected with the electrical means to effect energization of the solenoid when the film breaks; a cam on the shaft; an arm pivoted on the support to be engaged and moved by the cam, and a pair of switch contacts connected with the motor circuit, one contact being mounted on the support and the other on the arm whereby the motor circuit will be opened when the dowser swings to light obstructing position.

2. In combination with a motion picture projector, its film, motor circuit and lamp; a support; a shaft rockable in the support; a dowser carried by the shaft and adapted to swing in front to obstruct the light of the lamp; a notched member on the shaft; a latch pivoted on the support to engage the notched member and hold the dowser out of the way; electrical means connected to disengage the latch to release the dowser; film actuated means connected with the electrical means to effect disengagement of the latch when the film breaks, and a cam on the notched member adapted to engage and move the latch into engagement with the member when the dowser is swung from light obstructing position.

3. In combination with a motion picture projector, its film, motor circuit and lamp; a support; a shaft rockable in the support; a dowser carried by the shaft and adapted to swing in front to obstruct the light of the lamp; a notched member on the shaft; a latch pivoted on the support to engage the notched member and hold the dowser out of the way; electrical means connected to disengage the latch to release the dowser; film actuated means connected with the electrical means to effect disengagement of the latch when the film breaks; a stop fixed to the shaft to engage the latch and limit the downward swing of the dowser, and a cam fixed to the shaft to engage and move the latch into engagement with the notched member when the dowser is swung from light obstructing position.

4. In combination with a motion picture projector, its film, motor circuit and lamp; a support; a shaft rockable in the support; a dowser carried by the shaft and adapted to swing in front to obstruct the light of the lamp; a notched member on the shaft; a latch pivoted on the support to engage the member and hold the dowser out of the way; electrical means for disengaging the latch from the member to release the dowser; film actuated means connected with the electrical means to effect disengagement of the latch when the film breaks, and a spring pressed plunger slidable in the support to disengage the latch from the member.

In testimony whereof we have signed our names to this specification.

THOMAS LEWIS FEENEY.
HUMBERT GODOY.